United States Patent
Zhu

(10) Patent No.: US 11,109,140 B2
(45) Date of Patent: Aug. 31, 2021

(54) TERMINAL DEVICE, WIRELESS HEADSET AND ELECTRONIC DEVICE COMPONENT

(71) Applicant: BEIJING XIAOMI MOBILE SOFTWARE CO., LTD., Beijing (CN)

(72) Inventor: Xingquan Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/737,565

(22) Filed: Jan. 8, 2020

(65) Prior Publication Data
US 2021/0092506 A1     Mar. 25, 2021

(30) Foreign Application Priority Data

Sep. 19, 2019     (CN) .......................... 201921568931.6

(51) Int. Cl.
*H04R 1/10*     (2006.01)
*H01F 7/20*     (2006.01)

(52) U.S. Cl.
CPC .............. *H04R 1/1041* (2013.01); *H01F 7/20* (2013.01); *H04R 1/1016* (2013.01); *H04R 1/1091* (2013.01); *H04R 2420/07* (2013.01)

(58) Field of Classification Search
CPC ...... H04R 1/1016; H04R 1/1091; H04R 3/08; H04R 9/025; H04R 2209/024; H04R 2400/07; H04R 2420/07; H04R 1/1041
USPC .. 381/74, 370–371, 374, 376, 412, 420–421
See application file for complete search history.

(56) References Cited

U.S. PATENT DOCUMENTS

| | | | | |
|---|---|---|---|---|
| 10,129,626 | B1* | 11/2018 | Jung ........................ | H02J 7/342 |
| 10,425,515 | B2* | 9/2019 | Fan ...................... | H04M 1/0237 |
| 10,805,711 | B2* | 10/2020 | Tiefenau ............... | H04R 1/1041 |
| 2007/0133836 | A1* | 6/2007 | Lee ......................... | H04M 1/05 |
| | | | | 381/370 |
| 2007/0263893 | A1 | 11/2007 | Kim | |
| 2012/0281850 | A1* | 11/2012 | Hyatt ..................... | H04R 1/105 |
| | | | | 381/74 |
| 2017/0093079 | A1 | 3/2017 | Wagman et al. | |
| 2017/0093453 | A1 | 3/2017 | Panecki et al. | |
| 2017/0093454 | A1 | 3/2017 | Chawan et al. | |

(Continued)

FOREIGN PATENT DOCUMENTS

| | | |
|---|---|---|
| CN | 107968866 A | 4/2018 |
| CN | 108540592 A | 9/2018 |

(Continued)

OTHER PUBLICATIONS

Extended European Search Report in the European Application No. 20152449.3, dated Jun. 17, 2020, (12p).

*Primary Examiner* — Disler Paul
(74) *Attorney, Agent, or Firm* — Arch & Lake LLP

(57) ABSTRACT

The present disclosure provides a terminal device, a wireless headset, and an electronic device component. The terminal device includes: a body, a magnetic component, and a first controller. An accommodating groove for accommodating the wireless headset is disposed on the body. The magnetic component is at least partially disposed in the accommodating groove. The first controller is disposed in the body and electrically connected to the magnetic component, and is configured to control the magnetic component to connect to the wireless headset by attraction or to separate from the wireless headset by repulsion.

12 Claims, 12 Drawing Sheets

(56) References Cited

U.S. PATENT DOCUMENTS

| | | |
|---|---|---|
| 2017/0094381 A1 | 3/2017 | LeBlanc et al. |
| 2017/0094390 A1 | 3/2017 | Chawan et al. |
| 2017/0094391 A1 | 3/2017 | Panecki et al. |
| 2017/0094392 A1 | 3/2017 | Zorkendorfer et al. |
| 2017/0094393 A1 | 3/2017 | Panecki et al. |
| 2017/0094394 A1 | 3/2017 | McPeak et al. |
| 2017/0094395 A1 | 3/2017 | McPeak et al. |
| 2017/0094396 A1 | 3/2017 | Chandramohan et al. |
| 2017/0094397 A1 | 3/2017 | Wagman et al. |
| 2017/0094398 A1 | 3/2017 | Cousins et al. |
| 2017/0094399 A1 | 3/2017 | Chandramohan et al. |
| 2017/0238087 A1 | 8/2017 | Chawan et al. |
| 2017/0245038 A1 | 8/2017 | Chawan et al. |
| 2017/0347182 A1 | 11/2017 | Chawan et al. |
| 2018/0115816 A1 | 4/2018 | Panecki et al. |
| 2019/0253541 A1* | 8/2019 | Fan .................... H04N 1/00307 |
| 2019/0289381 A1 | 9/2019 | Chawan et al. |
| 2019/0289382 A1 | 9/2019 | Chawan et al. |
| 2019/0289383 A1 | 9/2019 | Chawan et al. |
| 2020/0190644 A1* | 6/2020 | Takatani .................... C23C 8/02 |
| 2020/0204898 A1* | 6/2020 | Schoeck ................ G06F 3/167 |
| 2020/0304896 A1* | 9/2020 | Cohen .................. H04R 1/1016 |

FOREIGN PATENT DOCUMENTS

| | | |
|---|---|---|
| EP | 1855507 A2 | 11/2007 |
| EP | 3151584 A2 | 4/2017 |
| WO | 2008013354 A1 | 1/2008 |
| WO | 2015026859 A1 | 2/2015 |

* cited by examiner

TERMINAL DEVICE, WIRELESS HEADSET AND ELECTRONIC DEVICE COMPONENT

CROSS-REFERENCE TO RELATED APPLICATIONS

The present application is based upon and claims priority to Chinese Patent Application No. 201921568931.6, filed on Sep. 19, 2019, the entire contents of which are incorporated herein by reference.

TECHNICAL FIELD

The present disclosure relates to the field of electronic devices, and more particularly, to a terminal device, a wireless headset, and an electronic device component.

BACKGROUND

The terminal device, having a loudspeaker function or a call answering function, may be used in cooperation with the wireless headset. The wireless headset becomes more and more popular because of its convenience. Usually, there is a special storage device for storing the wireless headset. However, the storage device is inconvenient to carry and easy to lose, so user experience is poor.

SUMMARY

The present disclosure provides an improved terminal device, a wireless headset, and an electronic device component.

An aspect of the present disclosure provides a terminal device, which may include: a body, on which an accommodating groove for accommodating a wireless headset is disposed; a magnetic component disposed in the accommodating groove; and a first controller disposed in the body and electrically connected with the magnetic component. The first controller is configured to control the magnetic component and the wireless headset to connect to each another by attraction or to separate from each another by repulsion.

Another aspect of the present disclosure provides a wireless headset. The wireless headset may be configured to be accommodated in an accommodating groove of a terminal device and may include: a headset body; a headset head disposed on one end of the headset body; and a magnetic element disposed on the headset head; wherein the magnetic element is configured to connect to the terminal device by attraction or to separate from the terminal device by repulsion.

Another aspect of the present disclosure provides an electronic device component, which may include: any abovementioned terminal device and any abovementioned wireless headset.

DETAILED DESCRIPTION

Figure 1:
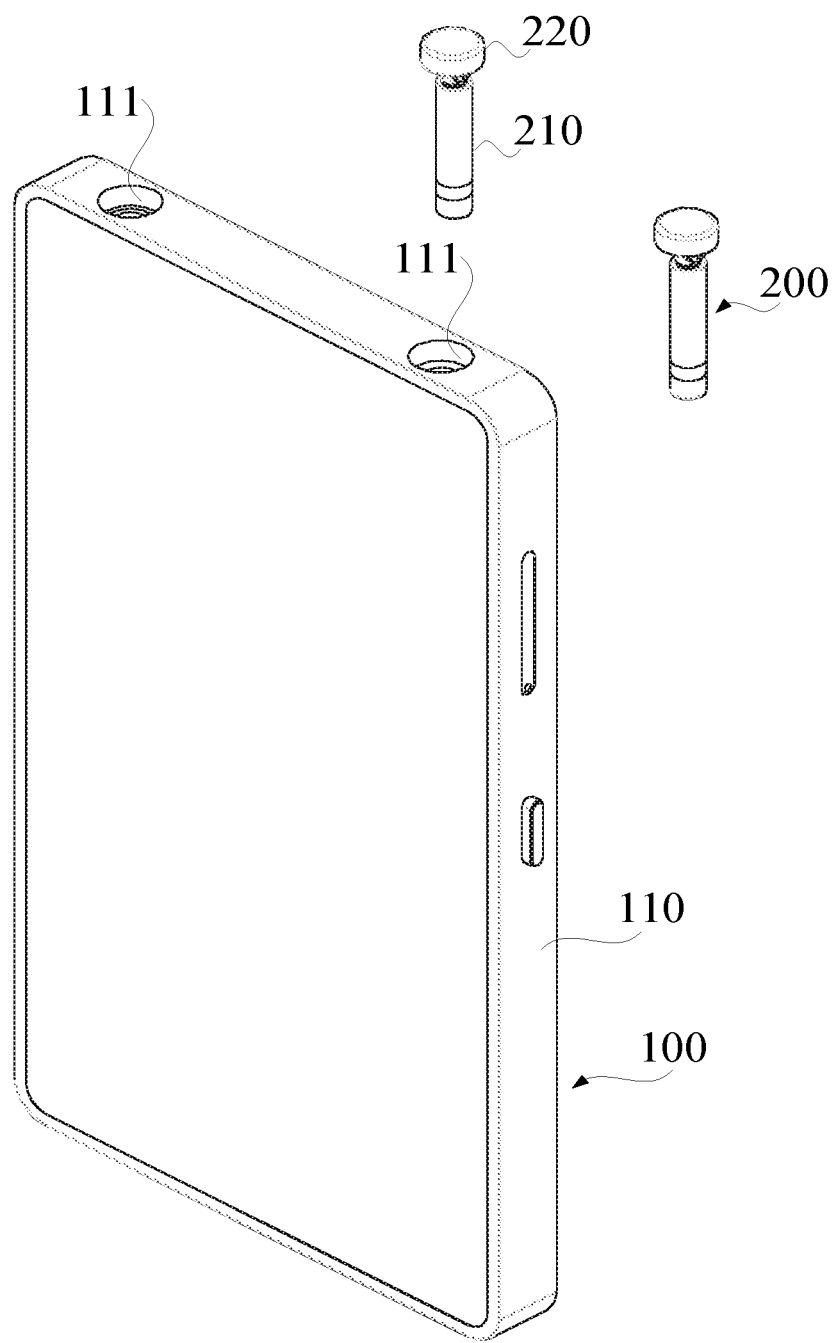
FIG. 1 is a part exploded view illustrating an electronic device component, according to an example.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. Unless otherwise specified, the technical or scientific terms used in the present disclosure shall have the ordinary meanings understood by those of ordinary skill in the art to which the present disclosure belongs. "First", "second" and similar terms mentioned in the specification and the claims of the present disclosure are adopted not to represent any sequence, number or importance but only to distinguish different parts. Similarly, similar terms such as "one" or "a/an" also do not represent a number limit but only represent existence of at least one. Unless otherwise specified, "comprise" or "include" and similar terms mean that elements or articles appearing before the "comprise" or "include" encompass the elements or articles appearing after the "comprise" or "include" and their equivalents, and other components or objects are not excluded. Similar terms such as "connect" or "interconnect" are not limited to physical or mechanical connection but may include electrical connection, either direct or indirect.

"A/an", "said" and "the" in a singular form in the specification and the appended claims of the present disclosure are also intended to include a plural form, unless other meanings are clearly denoted in the context of the present disclosure. It is also to be understood that term "and/or" used in the present disclosure refers to and includes one or any or all possible combinations of multiple associated items that are listed.

In some embodiments, an accommodating groove is arranged on a terminal device, and a wireless headset is accommodated in the accommodating groove by friction. But when the terminal device is shaken, the wireless headset easily falls from the accommodating groove, and the terminal device cannot accommodate the wireless headset firmly.

To solve the above problem, the embodiments of the present disclosure provide a terminal device, a wireless headset, and an electronic device component. The terminal device includes: a body, a magnetic component, and a first controller. An accommodating groove for accommodating a wireless headset is arranged on the body. The first controller is arranged in the body and is electrically connected with the magnetic component, and is configured to control the magnetic component to be connected to the wireless headset by attraction or separated from the wireless headset by repulsion. The terminal device provided by the embodiments of the present disclosure accommodates the wireless headset by means of the accommodating groove, which avoids providing a special storage device for the wireless headset, so it is allow a convenient storage of the wireless headset. The first controller controls the magnetic component to be connected to the wireless headset by attraction, so that the wireless headset is firmly accommodated in the accommodating groove to avoid the loss of the wireless headset. The first controller controls the magnetic component to be separated from the wireless headset by repulsion, and then it is convenient to take out the wireless headset from the accommodating groove.

The wireless headset may be accommodated in the accommodating groove of the terminal device. The wireless headset includes: a headset body, a headset head, and a magnetic element. The headset head is arranged on an end of the headset body. The magnetic element is arranged at the headset head. The magnetic element is connected to the terminal device by attraction or separated from the terminal device by repulsion. The wireless headset provided by the embodiments of the present disclosure may be accommodated in the accommodating groove of the terminal device. By connecting the magnetic element with the terminal device through attraction, the wireless headset is firmly accommodated in the accommodating groove of the terminal device, so the loss of the wireless headset is avoided. By separating the magnetic component from the terminal device through repulsion, it is convenient to take out the wireless headset from the accommodating groove.

The electronic device component includes a terminal device and a wireless headset. The wireless headset may be firmly accommodated in the accommodating groove of the terminal device, so it is convenient to accommodate the wireless headset to avoid the loss, and it is convenient to take out the wireless headset from the accommodating groove.

Figure 2:
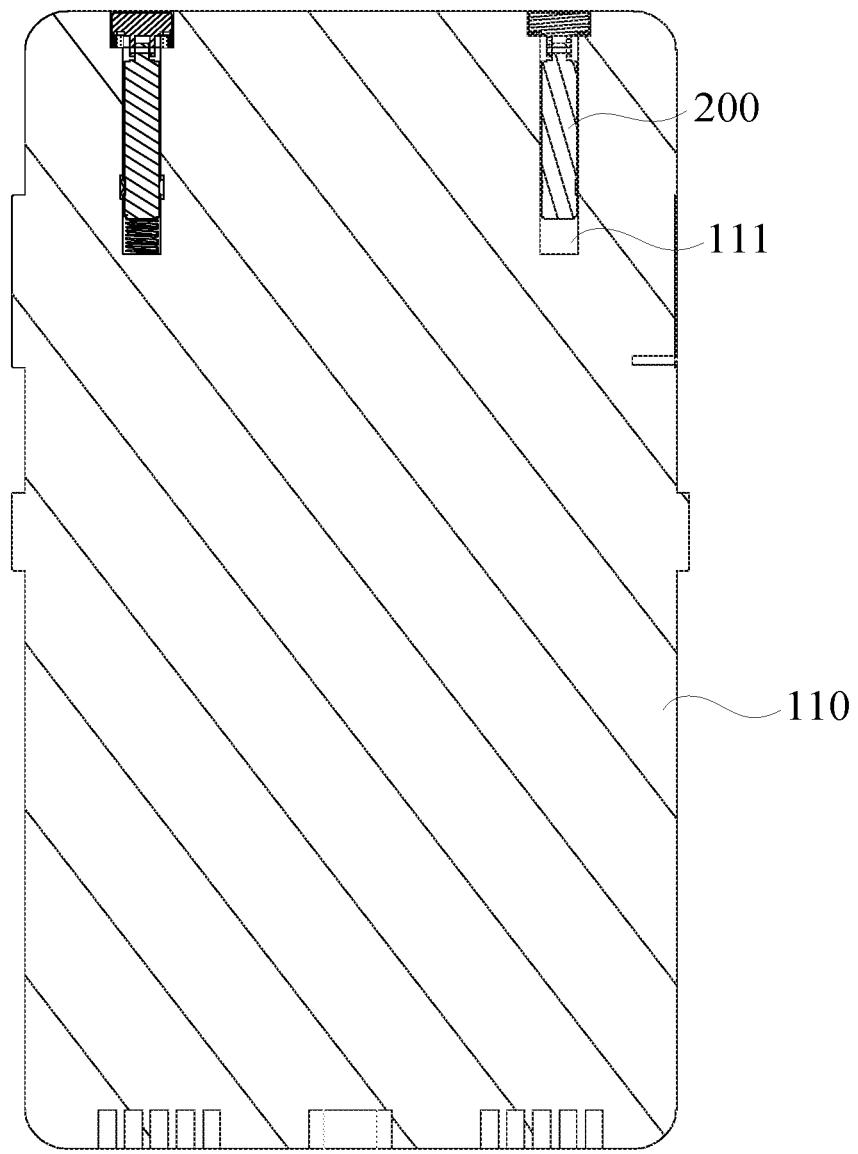
FIG. 2 is a part section view illustrating an electronic device component, according to an example.

FIG. 1 is a part exploded view illustrating an electronic device component, according to an example. FIG. 2 is a part section view illustrating an electronic device component, according to an example. As illustrated in FIG. 1 and FIG. 2, the electronic device component includes a terminal device 100 and a wireless headset 200. The terminal device 100 includes a body 110. An accommodating groove 111 for accommodating the wireless headset 200 is arranged on the body 110. The wireless headset 200 may be accommodated in the accommodating groove 111. In an embodiment, the accommodating groove 111 may be a cylindrical structure, a cuboid structure, a conical structure, and other regular or irregular structures, which is not limited by the present disclosure, as long as the wireless headset 200 may be accommodated in the accommodating groove.

Figure 3:
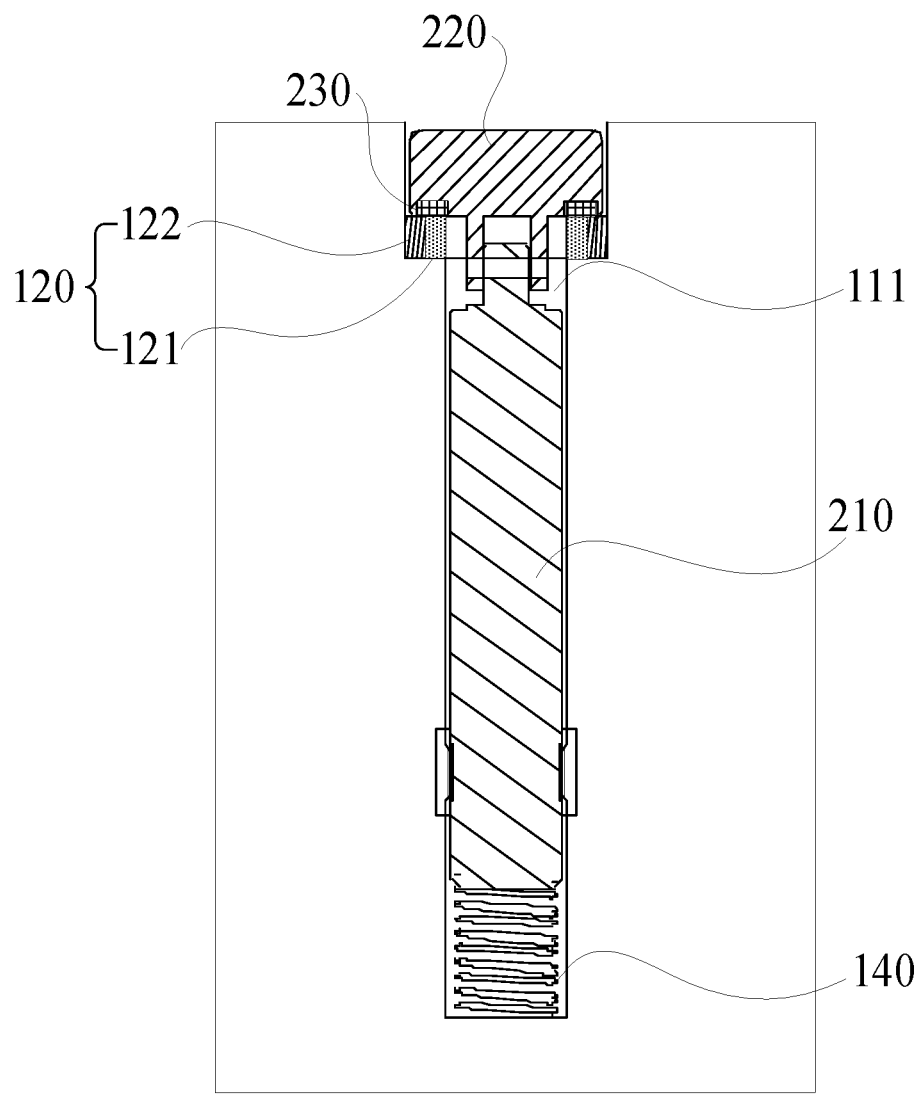
FIG. 3 is a part enlarged view illustrating an electronic device component, according to an example.
Figure 4:
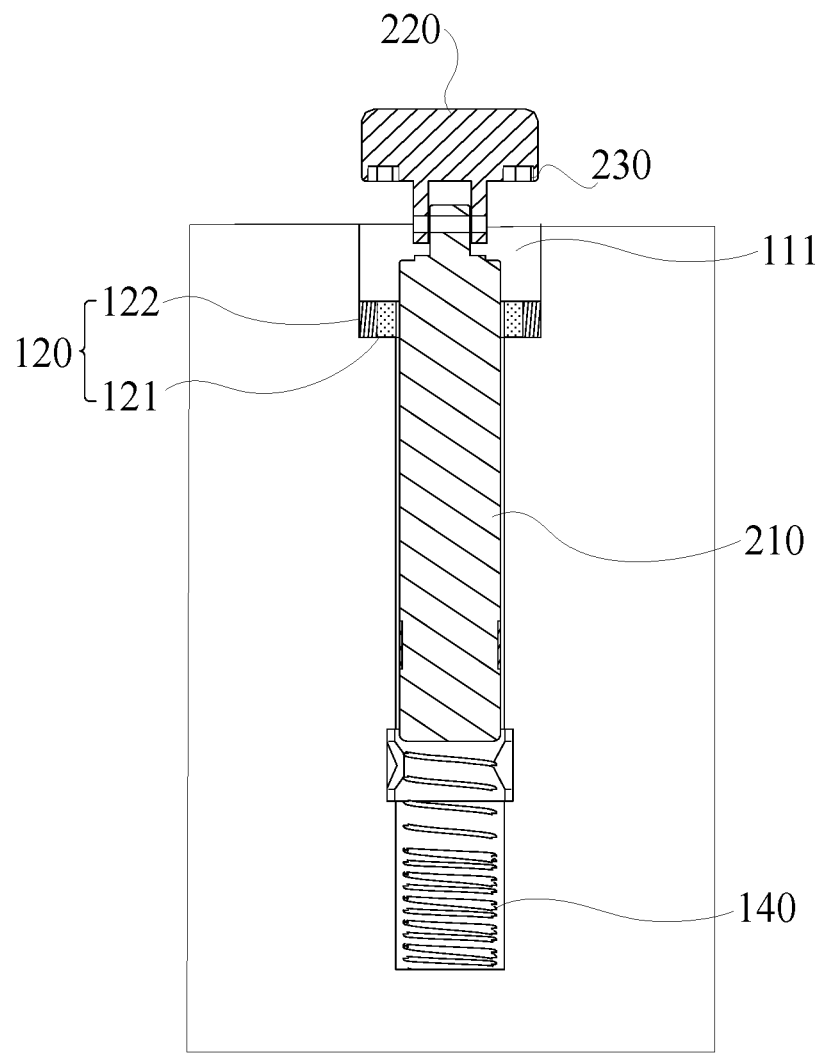
FIG. 4 is a part enlarged view illustrating an electronic device component, according to an example.

FIG. 3 is a part enlarged view illustrating an electronic device component, according to an example. FIG. 4 is a part enlarged view illustrating an electronic device component, according to an example. As illustrated in FIG. 3 and FIG. 4, the terminal device 100 may further include: a magnetic component 120 and a first controller 130 (not shown in FIG. 3 and FIG. 4, but shown in FIG. 8). The magnetic component 120 is arranged in the accommodating groove 111. The first controller 130 is arranged in the body 110 and electrically connected with the magnetic component 120, and is configured to control the magnetic component 120 to be connected to the wireless headset 200 by attraction or separated from the wireless headset 200 by repulsion. The wireless headset 200 includes: a headset body 210, a headset head 220, and a magnetic element 230. The headset head 220 is arranged on an end of the headset body 210. The magnetic element 230 is arranged at the headset head 220. The magnetic element 230 is connected to the terminal device 100 by attraction or separated from the terminal device 100 by repulsion. After the wireless headset 200 is accommodated in the accommodating groove 111 of the terminal device 100, the first controller 130 controls the magnetic component 120 to be connected to the magnetic element 230 by attraction, so that the wireless headset 200 is firmly accommodated in the accommodating groove 111, as illustrated in FIG. 3. The magnetic component 120 is separated from the magnetic element 230 by repulsion under the control of the first controller 130, to make it convenient to take out the wireless headset 200 from the accommodating groove 111, as illustrated in FIG. 4.

In an embodiment, as illustrated in FIG. 4, the accommodating groove 111 includes a limiting step, and the magnetic component 120 is arranged on the limiting step on the side of the limiting step of the accommodating groove 111 facing towards the headset head 220. A radial dimension of the headset head 220 is greater than the radial dimension of the headset body 210. The magnetic element 230 is arranged at the headset head 220 on the side of the headset head 220 adjacent to the headset body 210. In some embodiments, as illustrated in FIG. 3, when the wireless headset 200 is accommodated in the accommodating groove 111, the side, facing towards the headset body 210, of the headset head 220 is opposite to the limiting step, so that the magnetic component 120 and the magnetic element 230 are connected to each other by attraction, and then the wireless headset 220 is firmly accommodated in the accommodating groove 111 to avoid the loss. In an embodiment, the limiting step is in the form of a ring-shaped structure. In another embodiment, there are multiple limiting steps which are arranged along the circumferential direction of the accommodating groove 111. In an embodiment, the limiting step protrudes from an inner wall of the accommodating groove 111 in a radial direction of the accommodating groove 111, which facilitates the increase of contact area between the magnetic component 120 and the magnetic element 230.

In an embodiment, as illustrated in FIG. 3 and FIG. 4, the magnetic component 120 includes an electromagnet 121 electrically connected with the first controller 130. The first controller 130 controls the electromagnet 121 to attract or repel the wireless headset 200. The magnetic element 230 includes a second permanent magnet configured to be connected with the terminal device 100 by attraction. The second permanent magnet is connected with the magnetic component 120 of the terminal device 100 by attraction. In some embodiments, the first controller 130 controls current to flow through the electromagnet 121 in different directions, to generate magnetic fields in different directions, so as to attract or repel the second permanent magnet. The first controller 130 may further control the electromagnet 121 to be de-energized, so that the electromagnet 121 does not apply a magnetic force on the second permanent magnet.

In an embodiment, the magnetic component 120 may further include a first permanent magnet 122 for attracting the wireless headset 200, that is, the first permanent magnet 122 attracts the second permanent magnet. In some embodiments, the first permanent magnet 122 attracts the second permanent magnet, so it is beneficial to firmly positioning the wireless headset 200 in the accommodating groove 111, and then the wireless headset 200 is firmly fixed in the accommodating groove 111 by cooperatively using the electromagnet 121. In some other embodiments, when the terminal device 100 is turned off or powered off, the electromagnet 121 does not apply a magnetic force on the second permanent magnet, while the first permanent magnet 122 attracts the second permanent magnet, so the wireless headset 200 will not easy to separate from the terminal device 100, and thus will not easy to lost.

In an embodiment, the first permanent magnet 122, the electromagnet 121, and the second permanent magnet are in form of a ring-shaped structure. The first permanent magnet 122 is arranged around the electromagnet 121. The first permanent magnet 122 is flush with the side of the electromagnet 121 facing towards the headset head 220. The second permanent magnet may contact with both the first permanent magnet 122 and the electromagnet 121. In addition, the first permanent magnet 122, the electromagnet 121, and the second permanent magnet may also be in the form of other structures, which is not limited by the present disclosure. It is to be noted that repulsive force of the electromagnet 121 on the second permanent magnet is greater than attractive force between the first permanent magnet 122 and the second permanent magnet, so as to easily take out the wireless headset 200.

Figure 5:
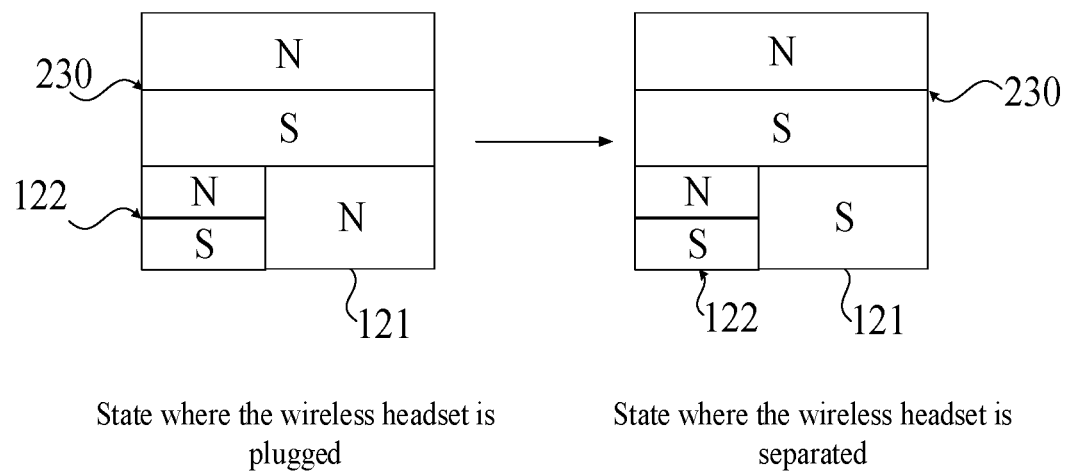
FIG. 5 is a schematic diagram illustrating magnetic attraction between a magnetic component and a magnetic element, according to an example.

FIG. 5 is a schematic diagram illustrating magnetic attraction between a magnetic component 120 and a magnetic element 230, according to an example. As illustrated in FIG. 5, the S pole of the second permanent magnet is connected with the N pole of the first permanent magnet 122 by attraction. After the wireless headset 200 is accommodated in the accommodating groove 111 of the terminal device 100, the first controller 130 adjusts the direction of the current flowing in the electromagnet 121, so that the end of the electromagnet 121 opposite to the second permanent magnet is set to be the N pole, and the electromagnet 121 and the first permanent magnet jointly attract the second permanent magnet. When the wireless headset 200 separates from the terminal device 100, the first controller 130 adjusts the direction of the current flowing in the electromagnet 121, so that the end of the electromagnet 121 opposite to the second permanent magnet is set to be the S pole. The electromagnet 121 repels the second permanent magnet, so that the wireless headset 200 separates from the electromagnet 121 and the first permanent magnet 122, and then it is convenient to take out the wireless headset 200 from the accommodating groove 111. In an embodiment, the terminal device 100 may has a virtual key or a physical key for controlling the electromagnet 121. By pressing the virtual key or the physical key, the first controller 130 controls the electromagnet 121 to attract or repel the wireless headset 200.

For taking out the wireless headset 200 from the accommodating groove 111, in an embodiment, as illustrated in FIG. 3 or FIG. 4, the terminal device 100 may further include: an elastic element 140 received in the accommodating groove 111. When the wireless headset 200 is plugged in the accommodating groove 111, the elastic element 140 deforms elastically along an insertion direction of the wireless headset 200 into the accommodating groove 111, and elastically presses against the wireless headset 200. In some embodiments, because the elastic element 140 deforms elastically along the insertion direction of the wireless headset 200 into the accommodating groove 111, the elastic element 140 applies an elastic force on the wireless headset 200 to eject the wireless headset 200 out from the accommodating groove 111 when the electromagnet 121 repels the wireless headset 200, and then it is convenient to take out the wireless headset 200 from the accommodating groove 111. When the wireless headset 200 is plugged in the accommodating groove 111, the elastic element 140 elastically presses against the wireless headset 200, so as to prevent the wireless headset 200 from colliding with the accommodating groove 111 to avoid wear of the wireless headset 200. In an embodiment, the elastic element 140 includes a spring. The spring has good elasticity and is easily available.

In an embodiment, on the side of the limiting step of the accommodating groove 111 facing towards the headset head 220, a first snapping portion is also arranged. In addition, on the side of the headset head 220 facing towards the limiting step (adjacent to the headset body 210), a second snapping portion is arranged. The second snapping portion and the first snapping portion are connected to each other by snap connection. After the wireless headset 200 is plugged in the accommodating groove 111, by pressing the wireless headset 200, the second snapping portion and the first snapping portion may be connected to each other by snap connection. By pressing the wireless headset 200 again, the first snapping portion and the first snapping portion may be separated from each other, and the elastic element 140 ejects the wireless headset 200 out from the accommodating groove 111.

Figure 6:
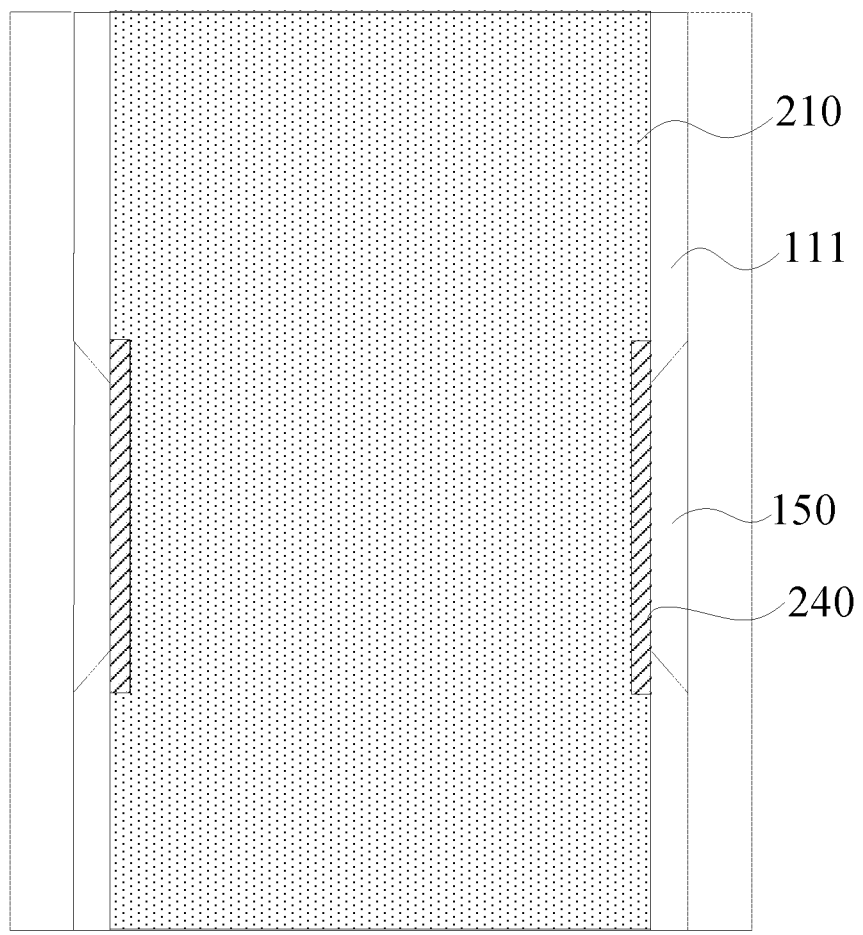
FIG. 6 is a part enlarged view illustrating an electronic device component, according to an example.

FIG. 6 is a part enlarged view illustrating an electronic device component, according to an example. In an embodiment, as illustrated in FIG. 6, a first electrifying point 150 protruding from the inner wall of the accommodating groove 111 is arranged on the inner wall. When the first electrifying point 150 is electrically connected with the wireless headset 200, the first controller 130 controls the terminal device 100 to charge the wireless headset 200. A second electrifying point 240 recessed in an outer surface of the headset body 210 is arranged on the outer surface, and is electrically connected with the terminal device 100. In some embodiments, after the wireless headset 200 is plugged in the accommodating groove 111, the first electrifying point 150 is electrically connected with the second electrifying point 240, so that the terminal device 100 is electrically connected with the wireless headset 200. When receiving a signal indicating that the terminal device 100 is electrically connected with the wireless headset 200, the first controller 130 may control the terminal device 100 to charge the wireless headset 200 to satisfy a power demand of the wireless headset 200. In an embodiment, the first electrifying point 150 protrudes from the inner wall of the accommodating groove 111 in radial direction, the second electrifying point 240 recessed radially in the outer surface of the headset body 210, so as to facilitate the electrical connection between the first electrifying point 150 and the second electrifying point 240. The present disclosure does not limit the structure and number of the first electrifying point 150 and the second electrifying point 240, as long as the terminal device 100 can be electrically connected with the wireless headset 200.

After the first electrifying point 150 is electrically connected with the second electrifying point 240, the first controller 130 can also detect that the wireless headset 200 is accommodated in the accommodating groove 111, and then control the electromagnet 121 to be energized, so that the electromagnet 121 attracts the second permanent magnet, and then the wireless headset 200 is firmly accommodated in the accommodating groove 111.

Figure 7:
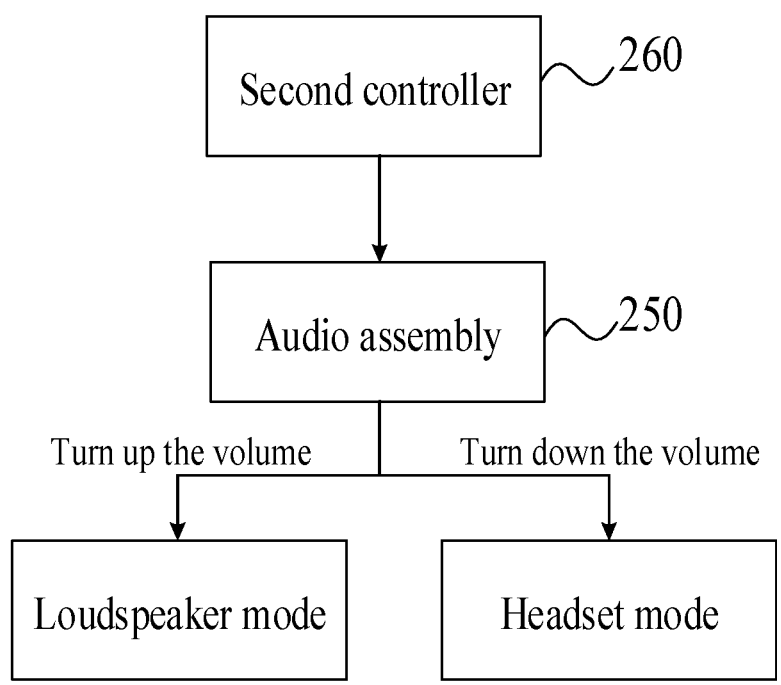
FIG. 7 is a schematic diagram illustrating the controlling of a functional device of a wireless headset, according to an example.

FIG. 7 is a schematic diagram illustrating the controlling of a functional device of a wireless headset 200, according to an example. In an embodiment, as illustrated in FIG. 7, the wireless headset 200 includes an audio assembly 250 and a second controller 260 arranged in the headset body 210. The audio assembly 250 is electrically connected with the second controller 260. When the second electrifying point 240 is electrically connected with the terminal device 100, the second controller 260 controls an operating mode of the audio assembly 250 to be a loudspeaker mode. In some embodiments, when the wireless headset 200 is electrically connected with the terminal device 100, the second controller 260 controls the audio assembly 250 to turn up the volume, so that the wireless headset 200 may operate in the loudspeaker mode, and then it is conducive to playing audio on the terminal device 100. In some other embodiments, the wireless headset 200 operating in the loudspeaker mode may generate a stereo effect by working together with the loudspeaker of the terminal device 100, thereby improving user experience. In some other embodiments, when the wireless headset 200 separates from the terminal device 100, the second controller 260 controls the audio assembly 250 to turn down the volume, so that the wireless headset 200 may operate in a headset mode. In such a manner that the wireless headset 200 automatically adjusts the operating mode, it is conducive to improving user experience and enhancing market competitiveness.

Figure 8:
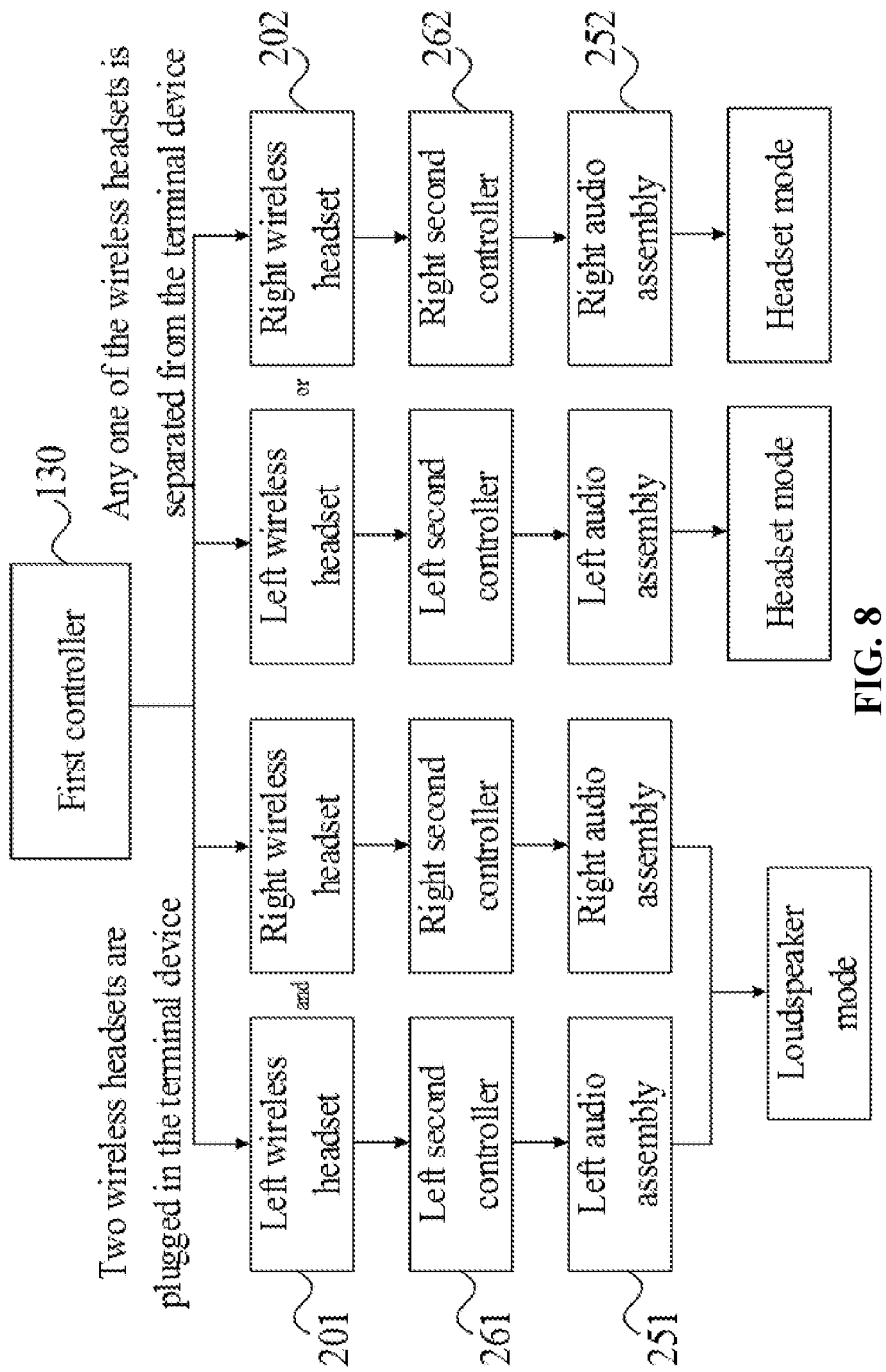
FIG. 8 is a schematic diagram illustrating the operation of a wireless headset in different cooperating relationships with a terminal device, according to an example.

In an embodiment, as illustrated in FIG. 1, there is at least one accommodating groove 111 for accommodating at least one wireless headset 200. There is at least one wireless headset 200. The wireless headset 200 is wirelessly connected with the terminal device 100 after separating from the accommodating groove 111. For example, there are two accommodating grooves 111, and the wireless headset 200 includes a left wireless headset 201 and a right wireless headset 202 which are respectively accommodated in the two accommodating grooves 111. FIG. 8 is a schematic diagram illustrating the opinion of a wireless headset 200 in different cooperating relationships with a terminal device 100, according to an example. The left wireless headset 201 includes a left second controller 261 and a left audio assembly 251 electrically connected to the left second controller. The right wireless headset 202 includes a right second controller 262 and a right audio assembly 252 electrically connected to the right second controller. As illustrated in FIG. 8, after both the left wireless headset 201 and the right wireless headset 202 are plugged in the accommodating groove 111 of the terminal device 100, the left second controller 261 controls the left audio assembly 251 to turn up the volume, so that the left wireless headset 201 operates in the loudspeaker mode, and the right second controller 262 controls the right audio assembly 252 to turn up the volume, so that the right wireless headset 202 operates in the loudspeaker mode. After the left wireless headset 201 is ejected from the terminal device 100, the left second controller 261 controls the left audio assembly 251 to turn down the volume, so that the left wireless headset 201 operates in the headset mode, and the right second controller 262 controls the right audio assembly 252 to turn down the volume, so that the right wireless headset 202 operates in the headset mode. In an embodiment, after any one of the left wireless headset 201 and the right wireless headset 202 separates from the terminal device 100, both of the two wireless headsets 200 operate in the headset mode. This is beneficial for the user to use a single wireless headset 200.

Figure 9:
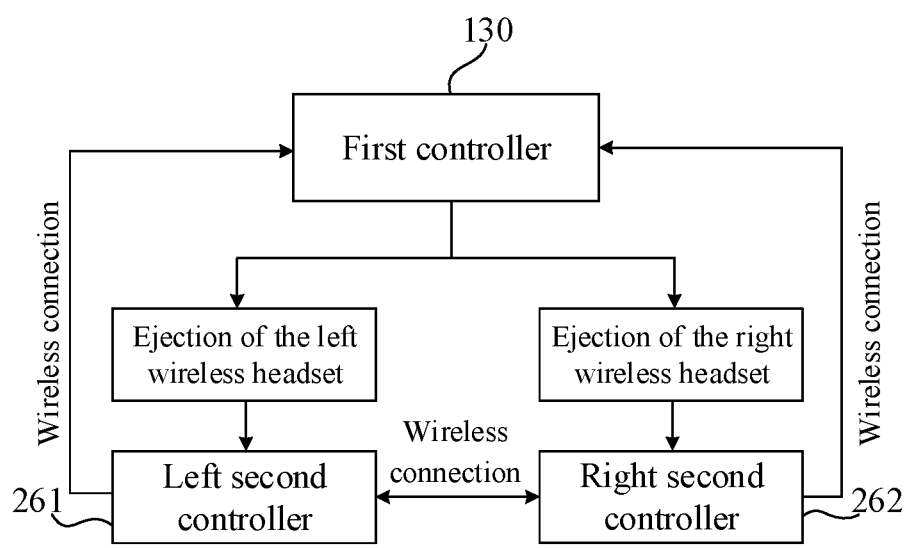
FIG. 9 is a schematic diagram illustrating the operation of a wireless headset in wireless connection with a terminal device, according to an example.

FIG. 9 is a schematic diagram illustrating the option of a wireless headset 200 in wireless connection with a terminal device 100, according to an example. In an embodiment, as illustrated in FIG. 9, after the left wireless headset 201 and the right wireless headset 202 are separated from the accommodating groove 111, the left wireless headset 201 and the right wireless headset 202 are wirelessly connected with the terminal device 100, and the wireless headset 201 and the right wireless headset 202 are in wireless connection with each other. In some embodiments, after separating from the accommodating groove 111, the left wireless headset 201 and the right wireless headset 202 are wirelessly connected to each other to send feedback data to each other, which ensures the synchronization of operation of the left wireless headset 201 and the right wireless headset 202. In an embodiment, the left wireless headset 201 includes a left sensor electrically connected with the left second controller 261, and the right wireless headset 202 includes a right sensor electrically connected with the right second controller 262. The left sensor is configured to detect whether the left wireless headset 201 is in a wireless connection state, and if the left wireless headset 201 is in the wireless connection state, the left sensor send feedback data to the first controller 130 of the terminal device 100. Similarly, the right sensor is configured to detect whether the right wireless headset 202 is in the wireless connection state, and if the right wireless headset 202 is in the wireless connection state, the right sensor sends feedback data to the first controller 130 of the terminal device 100. The terminal device 100 controls the synchronization of operation of the left wireless headset 201 and the right wireless headset 202 based on the feedback data.

Figure 10:
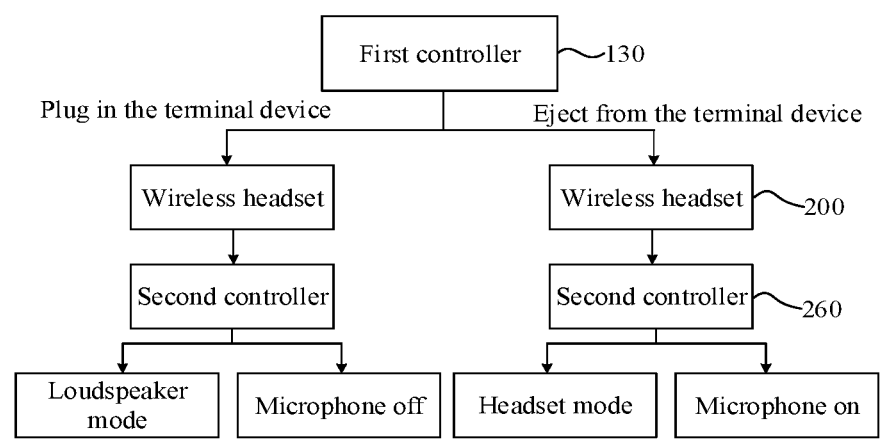
FIG. 10 is a schematic diagram illustrating the operation of a wireless headset in different cooperating relationships with a terminal device, according to an example.

FIG. 10 is a schematic diagram illustrating the option of a wireless headset 200 in different cooperating relationships with a terminal device 100, according to an example. In an embodiment, the wireless headset 200 may further include a microphone and a battery arranged in the headset body 210. Both the microphone and the battery are electrically connected with the second controller 260. When the wireless headset 200 is wirelessly connected with the terminal device 100, the wireless headset 200 records through the microphone the sound of the user during a call, and converts the sound into an electrical signal for transmission. As illustrated in FIG. 10, after the wireless headset 200 is plugged in the accommodating groove 111 of the terminal device 100, the second controller 260 controls the wireless headset 200 to operate in the loudspeaker mode and controls the microphone to be off. After the wireless headset 200 is ejected from the terminal device 100, the second controller 260 controls the wireless headset 200 to operate in the headset mode, and controls the microphone to be on, to facilitate the recording.

Figure 11A:
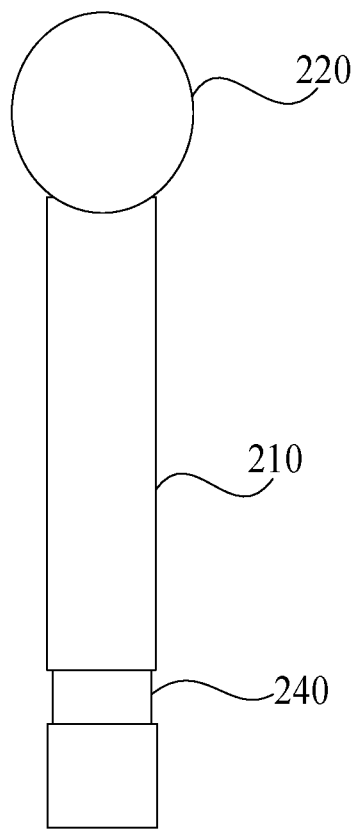
FIG. 11A is a state diagram of a wireless headset in worn state, according to an example.
Figure 11B:
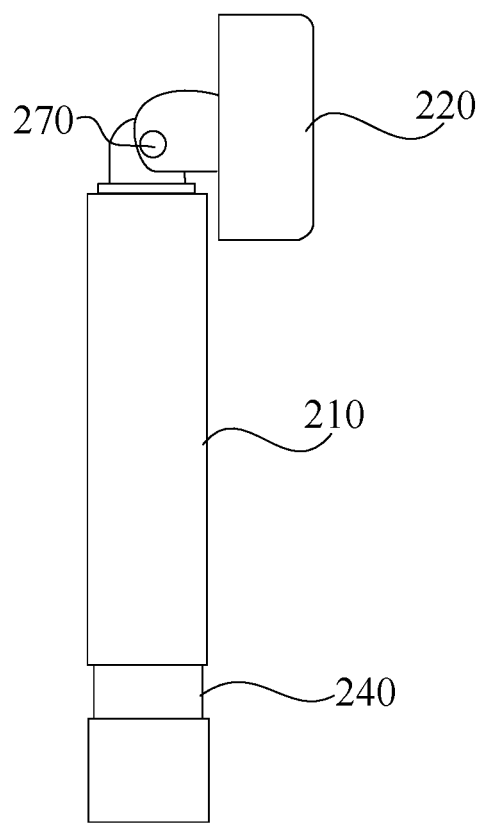
FIG. 11B are state diagrams of a wireless headset in worn state, according to an example.
Figure 12:
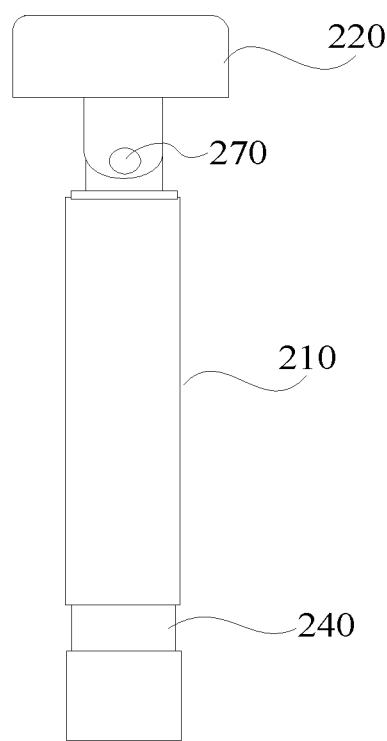
FIG. 12 is a state diagram of a wireless headset in accommodated state, according to an example.

FIGS. 11A and 11B are state diagram of a wireless headset 200 in worn state, according to an example. FIG. 11A shows a front view of the wireless headset 200 and FIG. 11B shows a side view of the wireless headset 200. FIG. 12 is a state diagram of a wireless headset 200 in accommodated state, according to an example. In an embodiment, the headset body 210 and the headset head 220 are rotatably connected to each other. In some embodiments, when the user wears the wireless headset 200, the headset body 210 or the headset head 220 may be rotated to render the wireless headset 200 in the state shown in FIGS. 11A and 11B. When the user accommodates the wireless headset 200 in the terminal device 100, the headset body 210 or the headset head 220 may be rotated to render the wireless headset 200 in the state shown in FIG. 12. In an embodiment, the headset body 210 is rotatably connected with the headset head 220 through a pin 270.

Method embodiments substantially correspond to the device embodiments, and thus related parts refer to part of descriptions of the device embodiments. The method embodiments and the device embodiments may complement each other.

The above embodiments of the present disclosure may complement each other in the absence of conflict.

The above is only the preferred embodiment of the present disclosure and not intended to limit the present disclosure. Any modifications, equivalent replacements, improvements and the like made within the spirit and principle of the present disclosure shall fall within the scope of protection of the present disclosure.

What is claimed is:

1. A terminal device, comprising:
a body, on which an accommodating groove for accommodating a wireless headset is disposed, wherein the wireless headset comprises a magnetic element;
a magnetic component at least partially disposed in the accommodating groove, wherein the magnetic component further comprises an electromagnet; and
a first controller disposed in the body and electrically connected to the electromagnet,
wherein the first controller is configured to control the electromagnet to connect to the magnetic element through attraction and to separate from the magnetic element through repulsion by changing a polarity of the electromagnet, and
wherein the magnetic component comprises a first permanent magnet arranged in the accommodating groove and configured to attract the magnetic element, wherein the first permanent magnet, the electromagnet, and the magnetic element is in form of a ring-shaped structure, and wherein the first permanent magnet is arranged around the electromagnet.

2. The terminal device of claim 1, wherein the accommodating groove comprises a limiting step protruding from an inner wall of the accommodating groove; wherein the magnetic component is positioned on a side of the limiting step within the accommodating groove facing towards a headset head of the wireless headset.

3. The terminal device of claim 1, further comprising: an elastic element disposed in the accommodating groove; when the wireless headset is plugged in the accommodating groove, the elastic element deforms elastically along an insertion direction of the wireless headset, and elastically presses against the wireless headset.

4. The terminal device of claim 1, wherein a first electrifying point is disposed on an inner wall of the accommodating groove and protrudes from the inner wall; when the first electrifying point is electrically connected to the wireless headset, the first controller controls the terminal device to charge the wireless headset.

5. The terminal device of claim 1, wherein there is at least one accommodating groove for accommodating at least one wireless headset.

6. An electronic device component, comprising:
a terminal device; and
a wireless headset,
wherein the terminal device comprises:
a body, on which an accommodating groove for accommodating the wireless headset is disposed;
a magnetic component at least partially disposed in the accommodating groove, wherein the magnetic component further comprises an electromagnet; and
a first controller disposed in the body and electrically connected to the electromagnet; and
wherein the wireless headset is configured to be accommodated in the accommodating groove of the terminal device, and comprises:
a headset body;
a headset head, disposed on one end of the headset body; and
a magnetic element, disposed on the headset head,
wherein the first controller is configured to control the electromagnet to connect to the magnetic element through attraction and to separate from the magnetic element through repulsion by changing a polarity of the electromagnet, and
wherein the magnetic component comprises a first permanent magnet arranged in the accommodating groove and configured to attract the magnetic element, wherein the first permanent magnet, the electromagnet, and the magnetic element is in form of a ring-shaped structure, and wherein the first permanent magnet is arranged around the electromagnet.

7. The electronic device component of claim 6, wherein a radial dimension of the headset head is greater than a radial dimension of the headset body; and the magnetic element is disposed on a side of the headset head adjacent to the headset body.

8. The electronic device component of claim 6, wherein the magnetic element comprises a second permanent magnet which is configured to connect to the terminal device by attraction.

9. The electronic device component of claim 6, wherein a second electrifying point is disposed on an outer surface of the headset body and is recessed in the outer surface of the headset body; and the second electrifying point is configured to electrically connect to the terminal device.

10. The electronic device component of claim 9, comprising an audio assembly and a second controller disposed in the headset body; wherein the audio assembly is electrically connected to the second controller; and when the second electrifying point is electrically connected to the terminal device, the second controller sets an operating mode of the audio assembly to a loudspeaker mode.

11. The electronic device component of claim 6, wherein there is at least one wireless headset; and the wireless headset is wirelessly connected to the terminal device after separating from the accommodating groove.

12. The electronic device component of claim 6, wherein the headset body and the headset head are rotatably connected to each other.

* * * * *